United States Patent
Ganrude et al.

(10) Patent No.: US 11,644,358 B2
(45) Date of Patent: May 9, 2023

(54) NESTING BALANCES

(71) Applicant: hand2mind, Inc., Vernon Hills, IL (US)

(72) Inventors: Jared Ganrude, Arlington Heights, IL (US); Elana Woldenberg, Chicago, IL (US); Brittany Goerig, Midlothian, TX (US)

(73) Assignee: hand2mind, Inc., Vernon Hills, IL (US)

( * ) Notice: Subject to any disclaimer, the term of this patent is extended or adjusted under 35 U.S.C. 154(b) by 197 days.

(21) Appl. No.: 17/222,750

(22) Filed: Apr. 5, 2021

(65) Prior Publication Data

US 2021/0404862 A1 Dec. 30, 2021

Related U.S. Application Data

(60) Provisional application No. 63/044,113, filed on Jun. 25, 2020.

(51) Int. Cl.
  *G01G 1/20* (2006.01)
  *G01G 21/22* (2006.01)
  *G01G 21/28* (2006.01)

(52) U.S. Cl.
  CPC ............ *G01G 21/22* (2013.01); *G01G 1/20* (2013.01); *G01G 21/28* (2013.01)

(58) Field of Classification Search
  CPC ............ G01G 1/18; G01G 1/20; G01G 21/22; G01G 21/28
  USPC .......................................................... 177/126
  See application file for complete search history.

(56) References Cited

U.S. PATENT DOCUMENTS

| | | | | |
|---|---|---|---|---|
| 3,106,975 A | * | 10/1963 | Madigan | G01G 19/00 177/127 |
| 3,502,163 A | * | 3/1970 | Stehl | G01G 21/04 177/246 |
| 3,592,277 A | * | 7/1971 | Ackeret | G01G 3/02 177/245 |
| 3,894,591 A | * | 7/1975 | Ackeret | G01G 19/56 177/229 |
| 4,042,050 A | * | 8/1977 | Myers | G01G 1/18 177/198 |
| 4,155,412 A | * | 5/1979 | Luchinger | G01G 21/22 177/165 |

(Continued)

*Primary Examiner* — Randy W Gibson
(74) *Attorney, Agent, or Firm* — Michael Best & Friedrich LLP

(57) ABSTRACT

A balance assembly having an assembled state and an unassembled state. The balance assembly comprises a base configured to receive a portion of a like base in a nesting relation in an unassembled state of the balance assembly, a pedestal coupled to the base in an assembled state of the balance assembly, the pedestal configured to receive a portion of a like pedestal in a nesting relation in the unassembled state, a lever removably and pivotably coupled to the pedestal about a fulcrum centered along a length of the lever in the assembled state, the lever configured to receive a portion of a like lever in a nesting relation in the unassembled state, and a pair of containers removably supported at opposite ends of the lever in the assembled state, each container configured to receive a portion of a like container in a nesting relation in the unassembled state.

19 Claims, 14 Drawing Sheets

(56) References Cited

U.S. PATENT DOCUMENTS

| | | | | |
|---|---|---|---|---|
| 6,509,534 B1 * | 1/2003 | Thadani | ................ | G01G 21/28 |
| | | | | 177/171 |
| 6,600,110 B1 * | 7/2003 | Thadani | .................. | G01G 1/36 |
| | | | | 177/171 |
| 2009/0205877 A1 * | 8/2009 | Claypool | ............... | G01G 21/22 |
| | | | | 177/239 |

* cited by examiner

NESTING BALANCES

CROSS-REFERENCE TO RELATED APPLICATIONS

This application claims priority to U.S. Provisional Patent Application No. 63/044,113, on Jun. 25, 2020, the contents of which is hereby incorporated by reference in its entirety.

BACKGROUND

The present disclosure relates to balances for weighing an object, and in particular balances that can be easily assembled and disassembled into component parts that are stackable and nestable with like parts of other balances of substantially the same or identical configuration for efficient storage and transport.

SUMMARY

In one embodiment, the present disclosure provides a balance assembly having an assembled state and an unassembled state. The balance assembly comprises a base configured to receive a portion of a like base in a nesting relation in an unassembled state of the balance assembly, a pedestal coupled to the base in an assembled state of the balance assembly, the pedestal configured to receive a portion of a like pedestal in a nesting relation in the unassembled state, a lever removably and pivotably coupled to the pedestal about a fulcrum centered along a length of the lever in the assembled state, the lever configured to receive a portion of a like lever in a nesting relation in the unassembled state, and a pair of containers removably supported at opposite ends of the lever in the assembled state, each container configured to receive a portion of a like container in a nesting relation in the unassembled state.

In another embodiment, the present disclosure provides a storage kit for one or more modular balances. The storage kit comprising components of a plurality of balances in an unassembled state, including a plurality of bases, a plurality of levers configured to removably and pivotably couple to the plurality of bases in an assembled state of the plurality of balances via a plurality of pedestals, and a plurality of containers configured to removably couple to the lever in the assembled state of the plurality of balances, each container configured to receive a portion of a like container in a nesting relation in the unassembled state. The storage kit also comprises a caddy including a first compartment supporting one or more portions of the plurality of bases in a nesting relation, a second compartment supporting one or more portions of the plurality of levers in a nesting relation, and a third compartment supporting one or more portions of a first set of the plurality of containers in a nesting relation.

Other aspects of the invention will become apparent by consideration of the detailed description and accompanying drawings.

DETAILED DESCRIPTION

Figure 1:
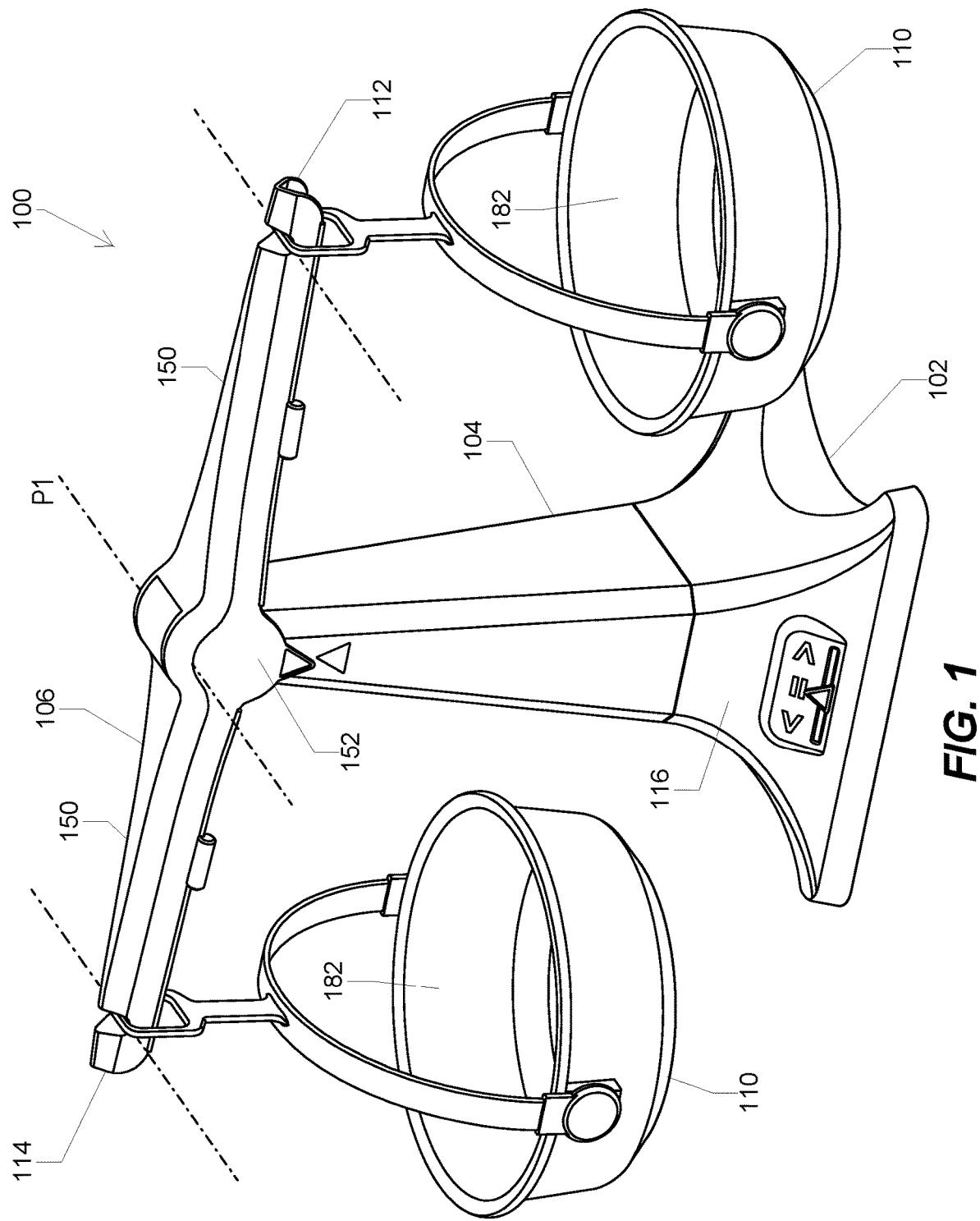
FIG. 1 is a perspective view of a nesting balance in accordance with a first embodiment of the present disclosure.
Figure 2:
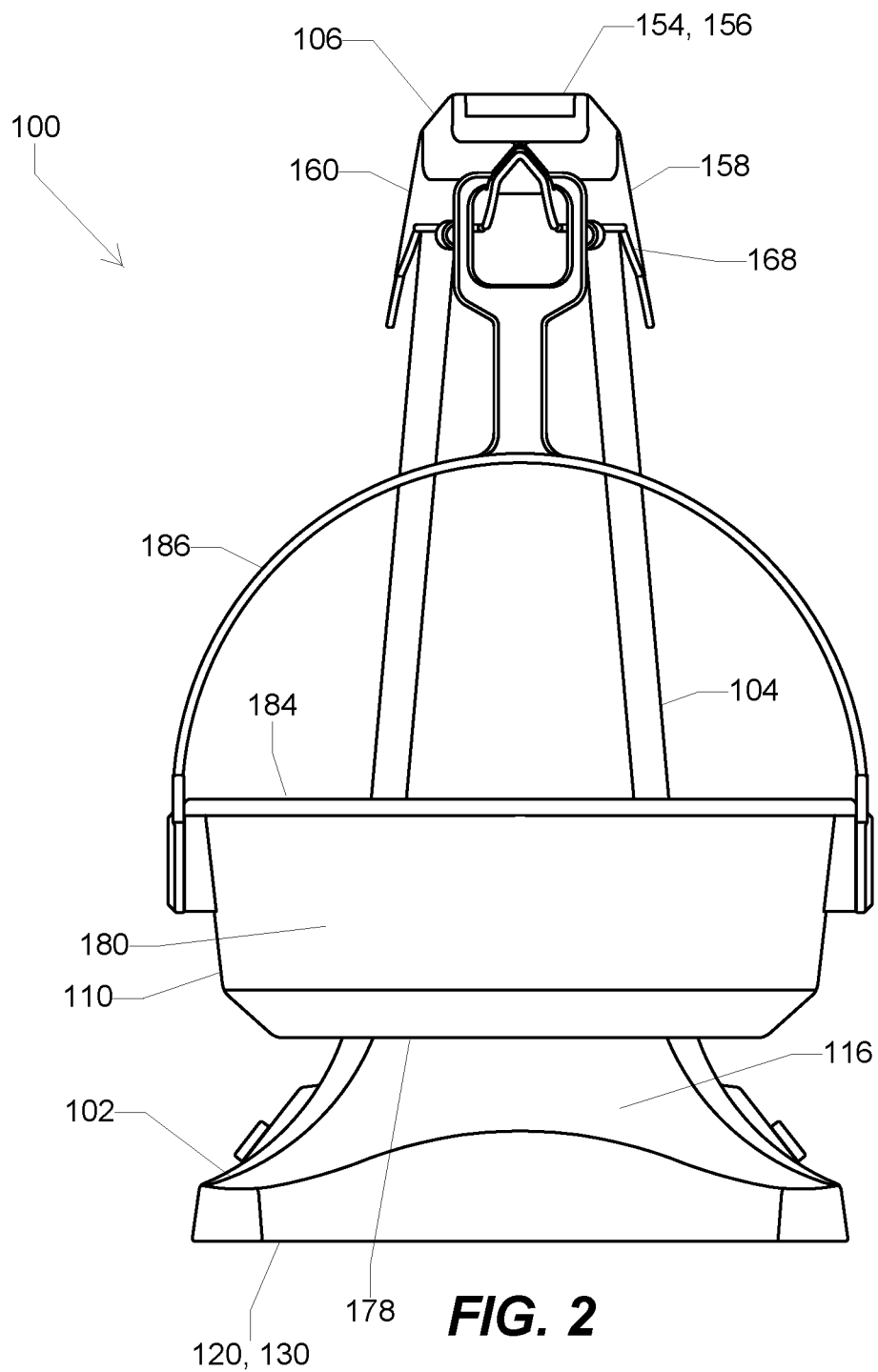
FIG. 2 is a right side elevational view of the nesting balance of FIG. 1.
Figure 3:
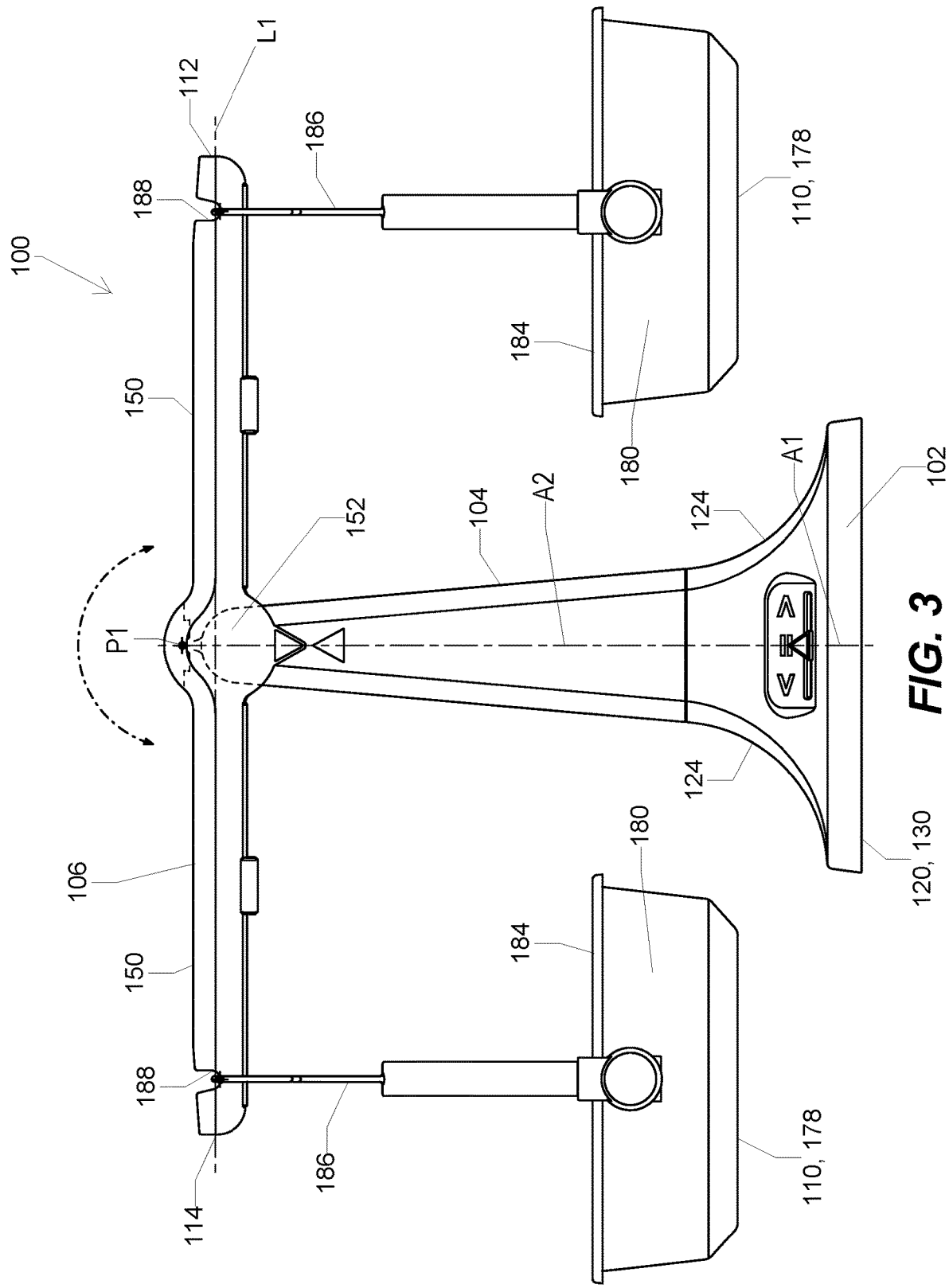
FIG. 3 is a front elevational view of the nesting balance of FIG. 1.

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Before any embodiments are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways. It should be understood that the description of specific embodiments is not intended to limit the disclosure from covering all modifications, equivalents and alternatives falling within the spirit and scope of the disclosure as defined in the appended claims. For the purposes of the present specification, all spatial and directional terms shall, unless specifically stated otherwise, refer to space and direction as perceived by a user of the fully assembled balance in the intended operational orientation of the balance, resting on level ground or an operating surface, e.g., a table, in a plane parallel to level ground. Consequently, the terms "vertical," "horizontal," "lower," "upper," "over," "under," "up," "down," "top," and "bottom" refer to the general orientation of a component or surface to which the term is applied relative to level ground when the balance is fully assembled and supported thereon, e.g., "vertical" refers to an orientation perpendicular to level ground.

The disclosure herein illustrates and describes embodiments of modular balances that can be easily assembled and disassembled into component parts that are stackable and nestable with like parts of other balances. Each of the balances illustrated and described herein may be used with a storage caddy, which will be discussed in greater detail below. It should be understood that any of the embodiments shown and described herein may include the storage caddy, even if not explicitly shown or discussed.

According to one embodiment, as illustrated in FIGS. 1-4, a modular balance 100 includes a base 102, a post or pedestal 104 removably coupled to and extending upwardly from the base 102, a horizontal lever 106 removably and pivotably coupled to the post 104 at a fulcrum 108, and a pair of identical removable containers 110 suspended at opposite ends 112, 114 of the lever 106. When the balance 100 is assembled, a user places an object to be weighed into one of the containers 110 suspended at one end 112, 114 and adds/removes one or more weights to the container 110 suspended at the other end 112, 114 until the lever 106 is at equilibrium and the object is balanced. The weights then indicate the weight or mass of the object. When the balance 100 is disassembled, each of the base 102, the post 104, the lever 106, and the containers 110 is stackable and nestable, respectively, with a base 102', a post 104', a lever 106', and a container 110' of a like balance 100' for convenient storage of the balances.

The base 102 includes a main body 116 having a hollow interior cavity 118 that extends between an open bottom end 120 and an open top end 122 the main body 116. The open bottom end 120 may define a generally flat, planar face for supporting the balance 100 on a flat operating surface. The open bottom end 120 and the hollow interior cavity 118 cooperate to receive a portion of a main body 116 of a similarly oriented, like base 102' when the base 102 is stacked on top of the like base 102'. The hollow interior cavity 118 of the main body 116 is configured to accommodate the received portion of the main body 116' of the like base 102' for nested engagement within the hollow interior cavity 118 when the base 102 is stacked on top of the like base 102'. The open top end 122 of the main body 116 is configured to removably attach to the post 104 in an assembled state of the balance 100, as described below. The open bottom end 120 and the open top end 122 of the main body 116 are diametrically opposed and define a longitudinal central axis A1 of the main body 116 therebetween that is perpendicular to a plane containing the open bottom end 120.

In the illustrated embodiment, for example, the main body 116 of the base 102 includes two pairs of opposed side walls 124 that are joined together and cooperate with one another to form the hollow interior cavity 118 therebetween. The side walls 124 define bottom edges 130 that form the open bottom end 120 and top edges 132 that form the open top end 122, each having a generally rectangular, hollow configuration. Portions of the side walls 124 proximate the open bottom end 120 may extend vertically upward from the bottom edges 130 so as to form a flat-walled shoulder portion 126 of the main body 116. The side walls 124 each curve inward toward the longitudinal central axis A1 and upward from the flat-walled shoulder portion 126 to a flat-walled neck portion 128 of the main body 116 so as to facilitate nesting of a like base 102' in the hollow interior cavity 118. In a nested position, the neck portion 128 of the base 102 receives the neck portion 128' of a like base 102' in the hollow interior cavity 118 and the shoulder portion 126 of the base 102 rests upon the shoulder portion 126' of the like base 102'.

In addition, portions of the side walls 124 proximate the open top end 122 form the flat-walled neck portion 128 with a hollow, approximately rectangular transverse cross section. The neck portion 128 defines a female end connector for a telescoping connection at a correspondingly shaped bottom end of the post 104, as described below.

The post 104 has a generally hollow tubular shape that is tapered along a length of the post 104 extending from an open bottom end 134 of the post 104 so as to facilitate nesting of a like post 104' therein. In the illustrated embodiment, the post 104 includes a plurality of generally flat side walls 136 that gradually slope inward toward a longitudinal central axis A2 of the post 104 and upward from the open bottom end 134 to a closed top end 138 of the post 104. The side walls 136 cooperate with one another to define a hollow tube of rectangular or square transverse cross section with a gradual, smooth taper. In a nested position, the closed top end 138' of a like post 104' is received in the hollow interior 135 of the post 104 proximate the closed top end 138 of the post 104.

The open bottom end 134 of the post 104 is shaped and sized as a male end connector configured to be telescopically received by the neck portion 128 of the main body 116 of the base 102 with a light friction fit for easy assembly and disassembly by hand. In the illustrated embodiment, for example, the post 104 includes a stepped down or recessed portion along its longitudinal central axis A2 at the open bottom end 134 so as to form a male connector having a generally rectangular transverse cross section. Once assembled and seated over the neck portion 128 of the main body 116, the post 104 is oriented vertically on the base 102 such that the longitudinal central axis A2 of the post 104 is generally aligned with or co-axial with the longitudinal central axis A1 of the main body 116. The post 104 is rigidly and removably coupled to the base 102 via engagement between the stepped down, open bottom end 134 of the post and the neck portion 128 of the base.

Figure 4A:
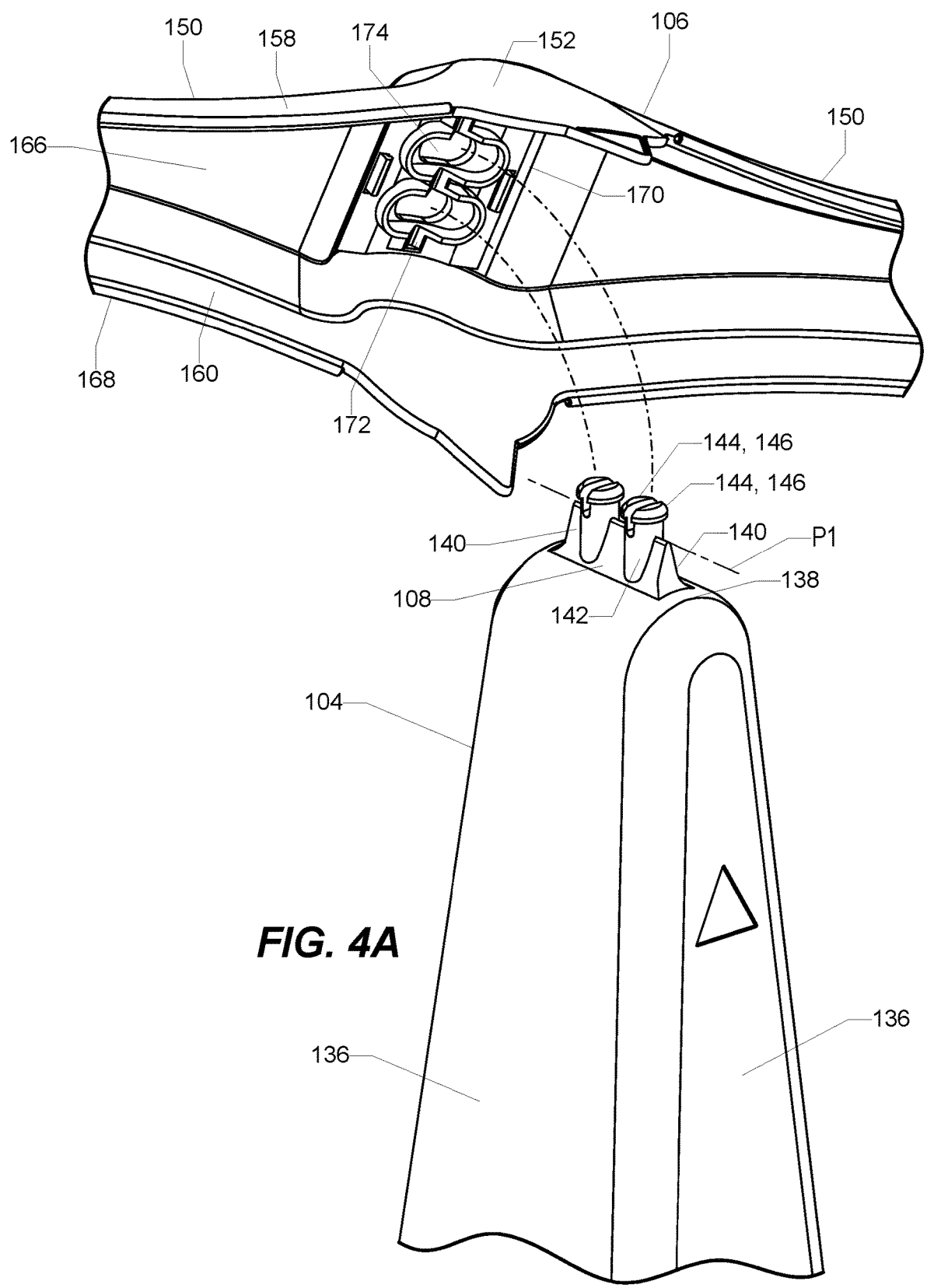
FIG. 4A is a partial exploded perspective view of a pedestal and a lever of the nesting balance of FIG. 1.
Figure 4B:
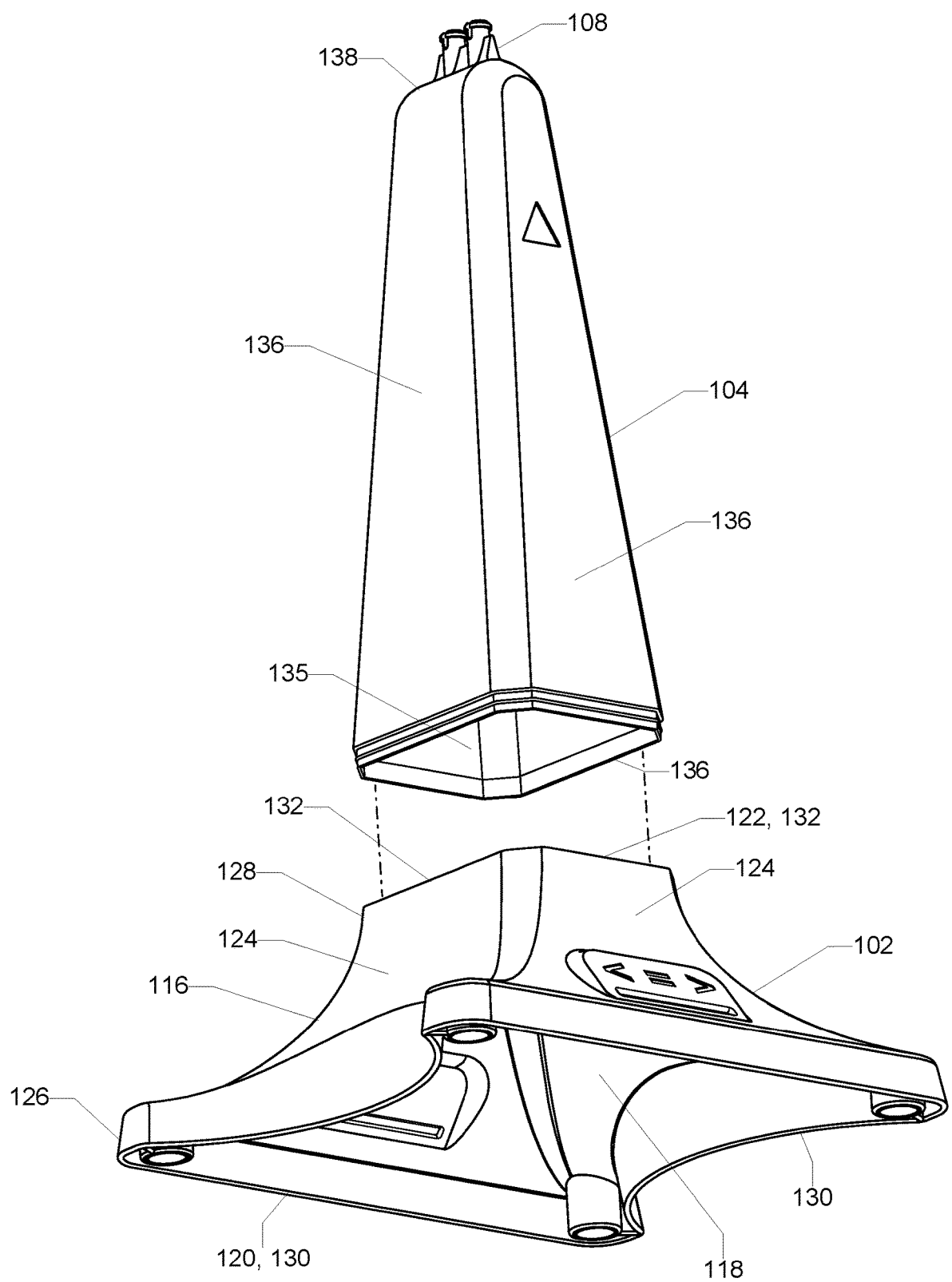
FIG. 4B is a partial exploded perspective view of a base and a pedestal of the nesting balance of FIG. 1.
Figure 5:
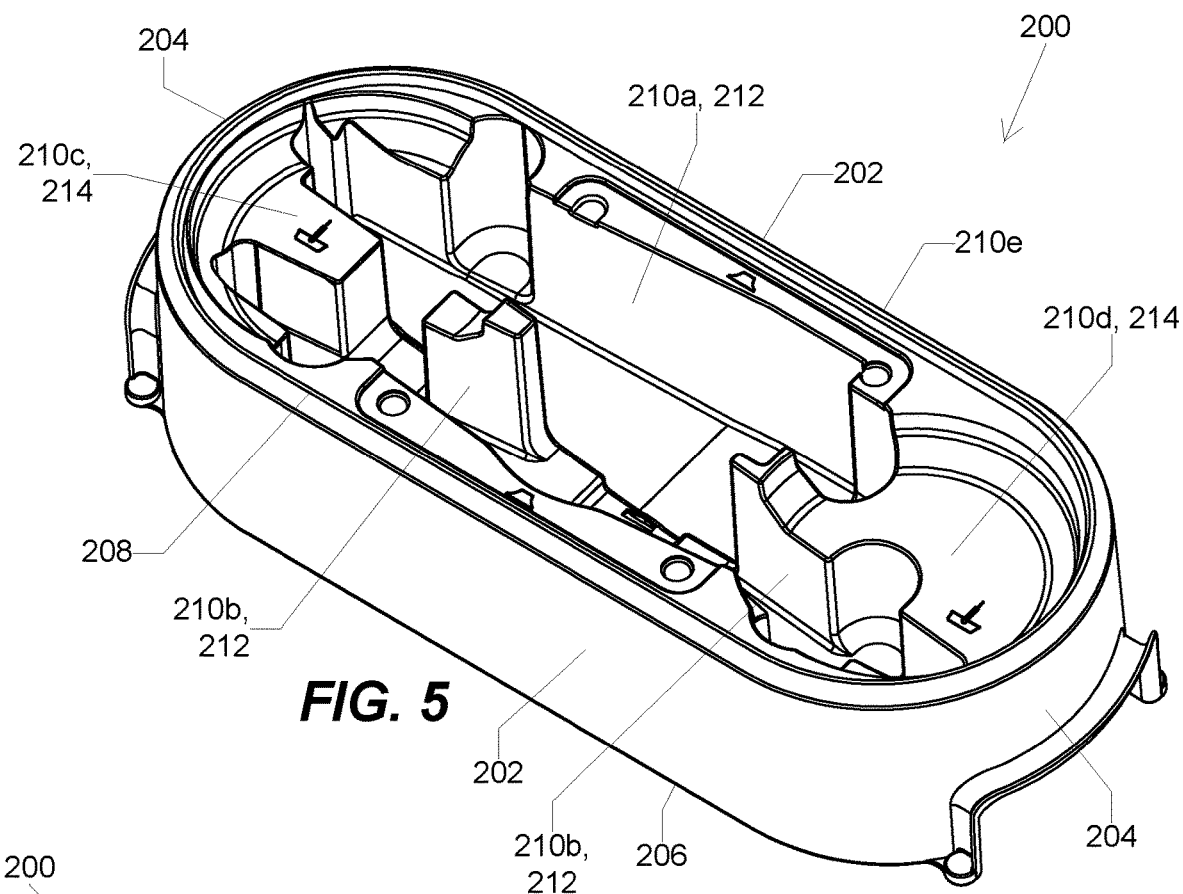
FIG. 5 is a perspective view of a storage caddy for storing components of the nesting balance of FIG. 1.
Figure 6:
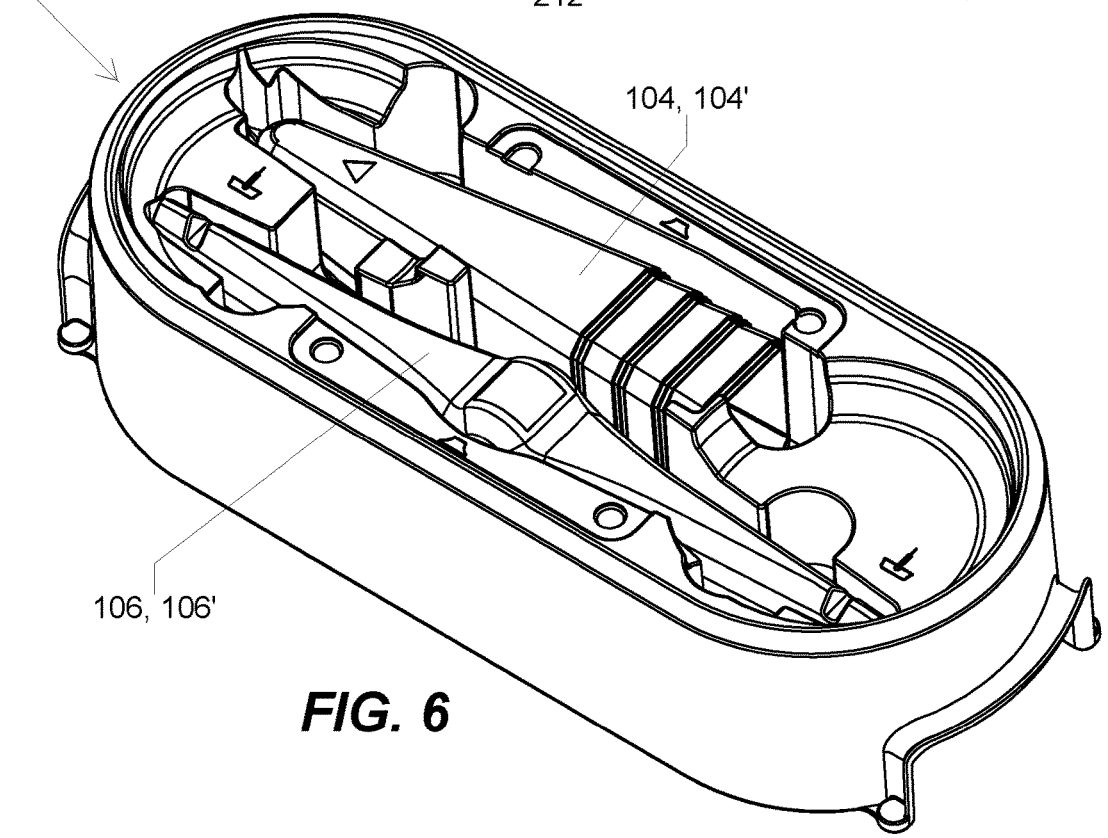
FIG. 6 is a perspective view of the storage caddy of FIG. 5 with levers and pedestals of like nesting balances stored therein.
Figure 7:
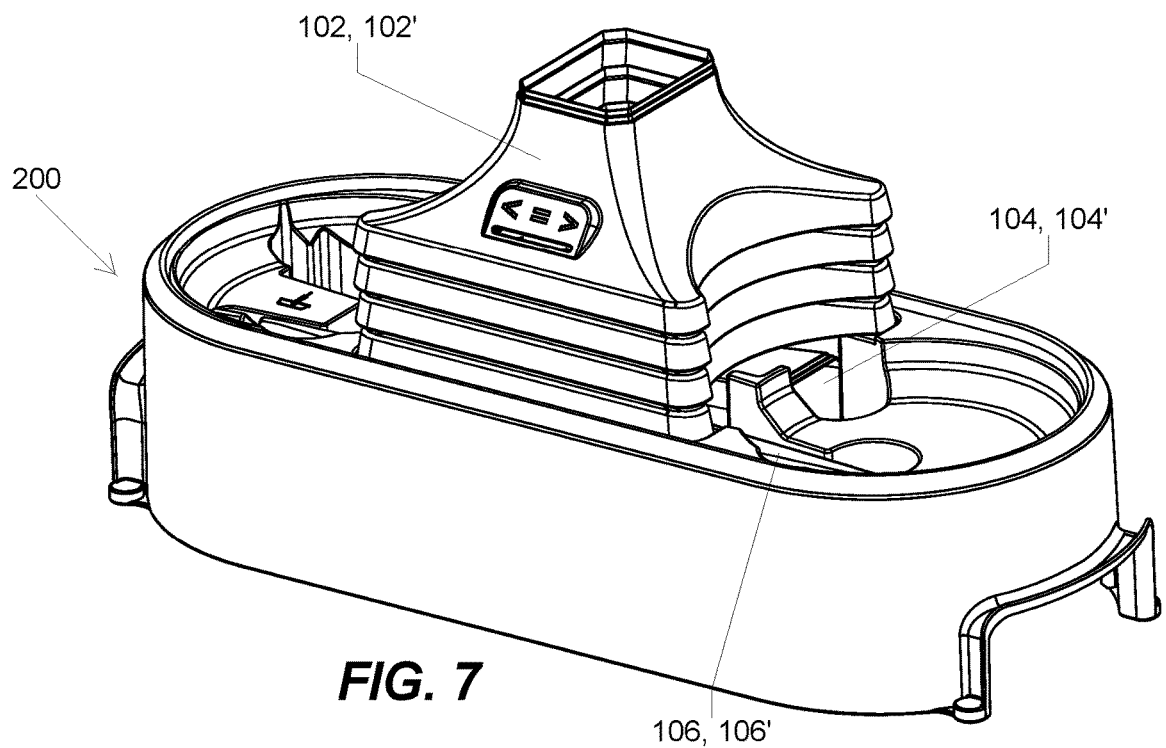
FIG. 7 is a perspective view of the storage caddy of FIG. 5 with levers, pedestals and bases of like nesting balances stored therein.
Figure 8:
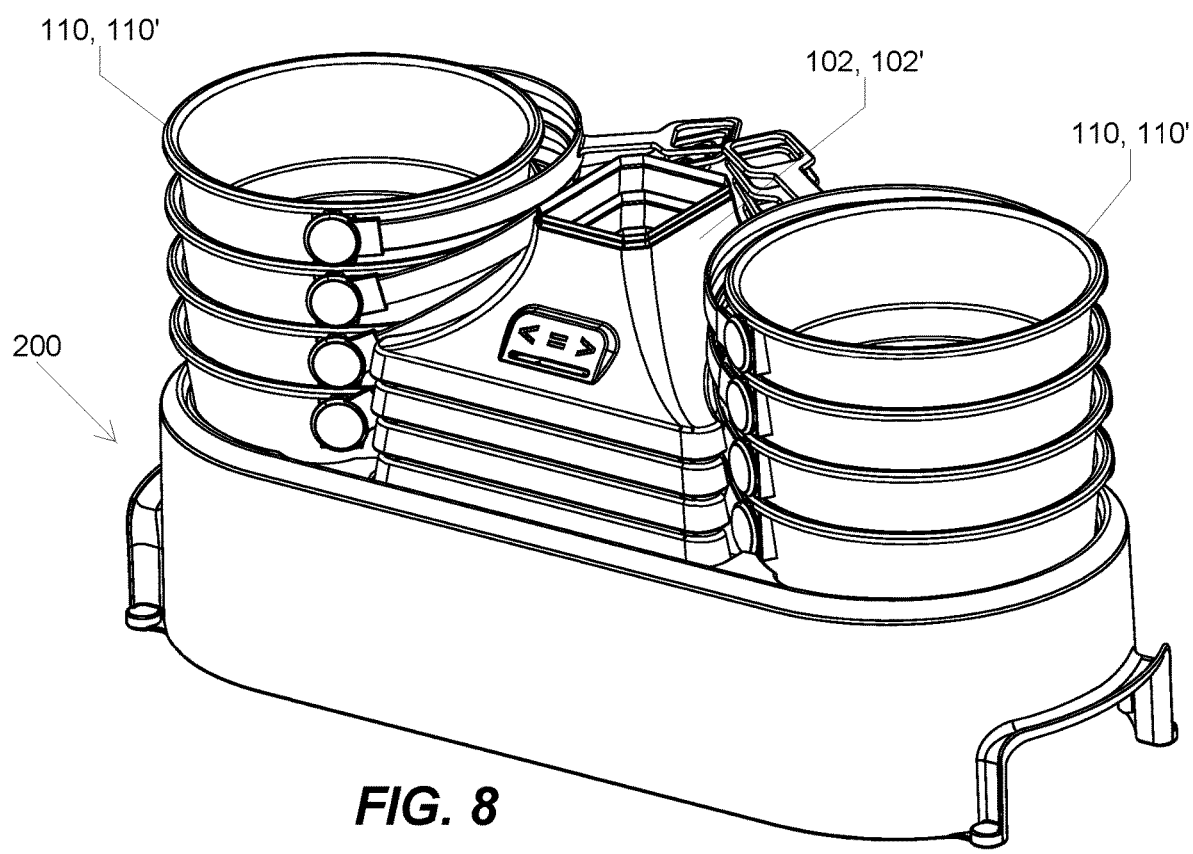
FIG. 8 is a perspective view of the storage caddy of FIG. 5 with levers, pedestals, bases and containers of like nesting balances stored therein.
Figure 9:
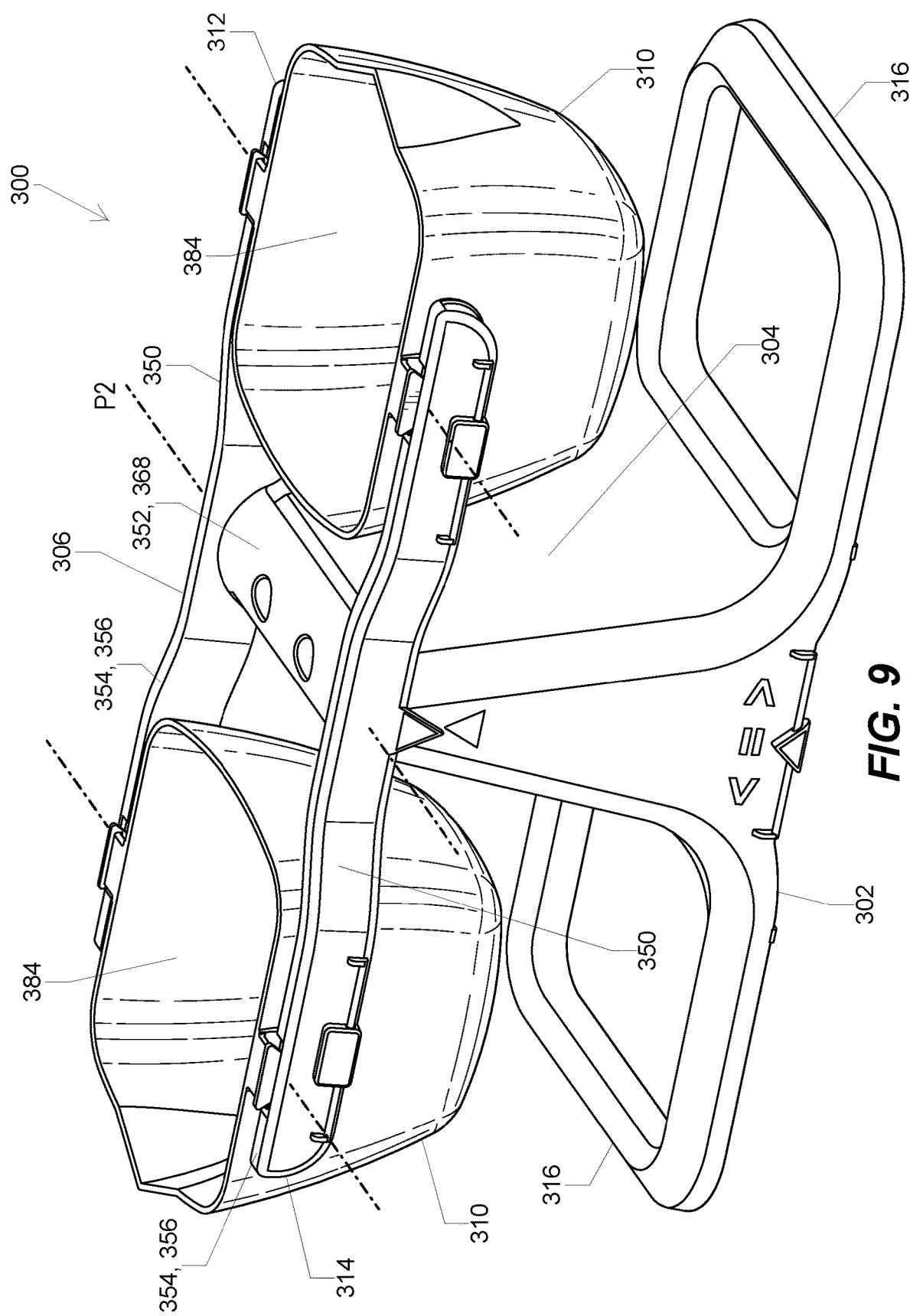
FIG. 9 is a perspective view of a nesting balance in accordance with a second embodiment of the present disclosure.
Figure 10:
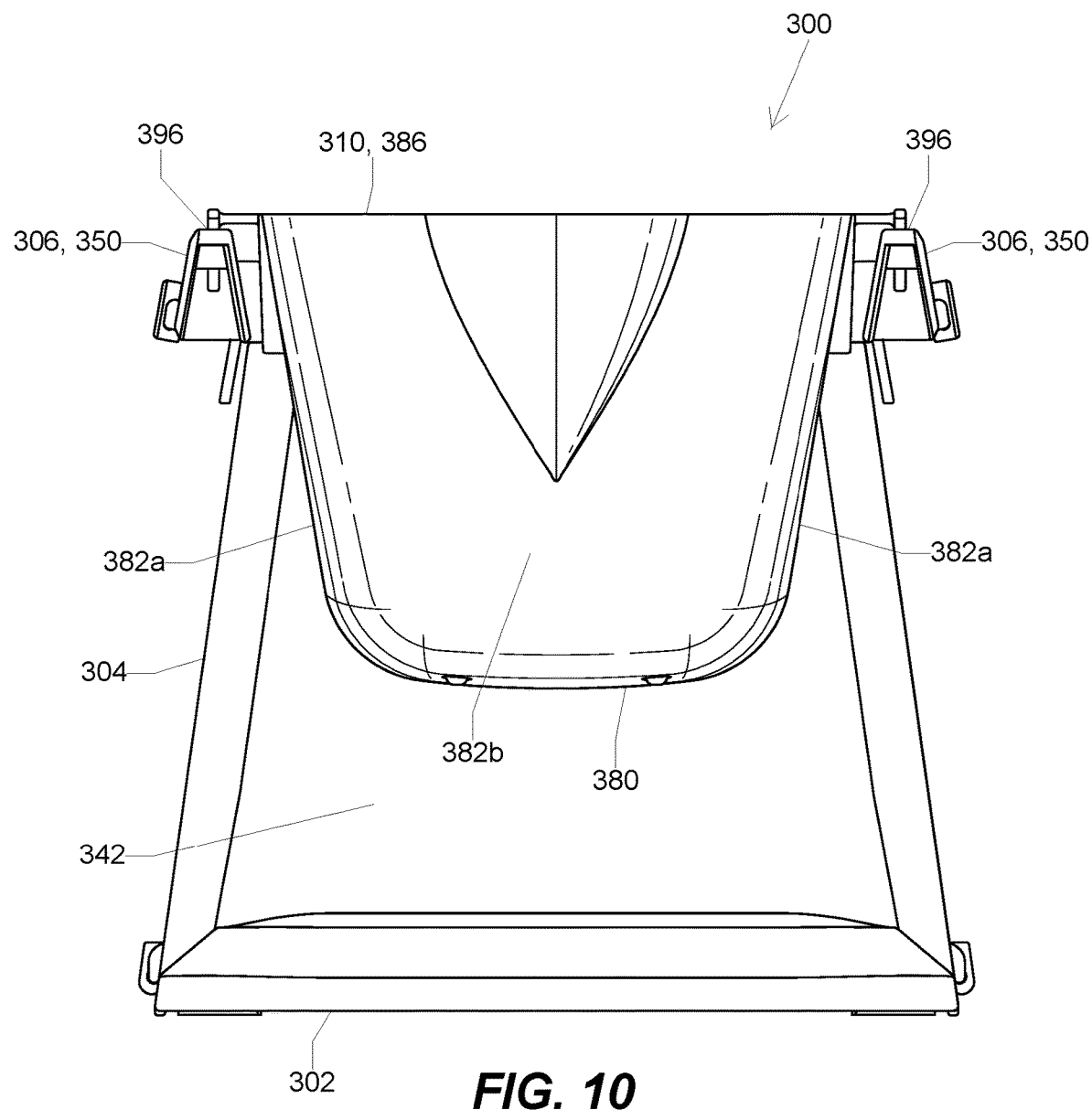
FIG. 10 is a right side elevational view of the nesting balance of FIG. 9.
Figure 11:
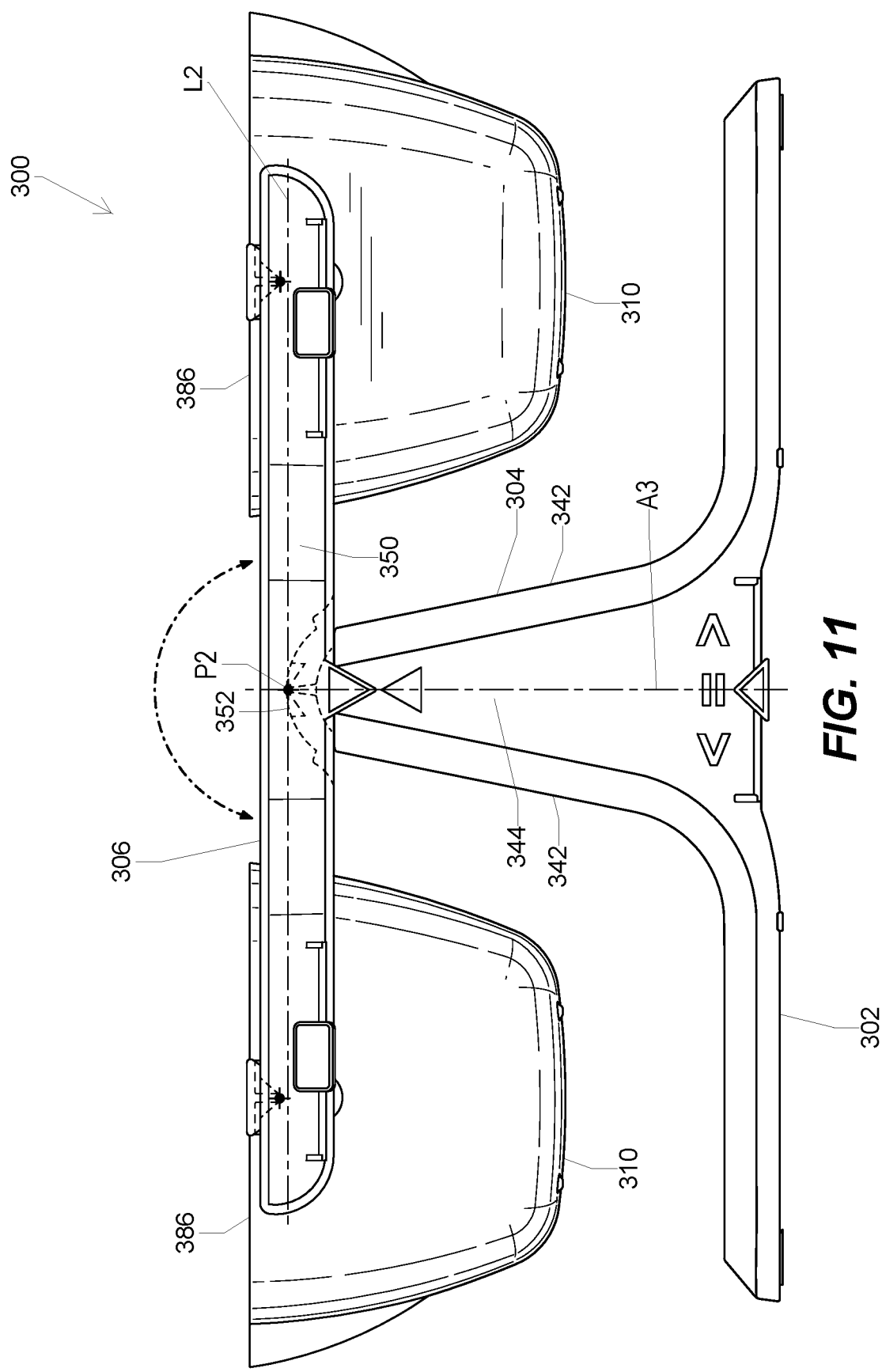
FIG. 11 is a front elevational view of the nesting balance of FIG. 9.

With reference to FIG. 4A, the closed top end 138 of the post 104 is configured to pivotably support the lever 106 about the fulcrum 108 in an assembled state of the balance 110. In the illustrated embodiment, the fulcrum 108 includes a plurality of upwardly directed wedge members or inverted V-shaped knife edges 140 arranged on the closed top end 138 of the post 104. The knife edges 140 form a support on which the lever 106 pivots and are aligned with one another on a line that defines a pivot axis P1 of the lever 106, the pivot axis P1 being oriented perpendicular to a longitudinal axis L1 of the lever 106 and the longitudinal central axis A2 of the post 104. The knife edges 140 may be integrally formed with the post 104 or they may be individual components separately formed and attached to the post 104.

The closed top end of the post 104 may also have one or more retention bosses 142 arranged thereon. The retention bosses 142 are configured to cooperate with elongated slots 174 of the lever 106 to facilitate pivotably and releasably securing the lever 106 on the post 104. The retention bosses 142, for example, may each include a pair of resilient fingers 144 aligned opposite the elongated slots 174 in a vertical orientation and having barbed ends 146 configured to provide a releasable snap-fit coupling with the lever 106 in the elongated slots 174, as described in more detail below. The retention bosses 142 may be integrally formed with the post 104 or they may be individual components separately formed and attached to the post 104.

With reference again to FIGS. 1-4, the lever 106 includes a pair of arms 150 of equal length that extend horizontally in opposite directions from a central hub portion 152. In the illustrated embodiment, the lever 106 is formed as a shell body having an elongated shape that is tapered inward at both ends. The shell body defines a length along its longitudinal axis and is symmetrical about a plane perpendicular to its longitudinal axis and passing through the midpoint of the length of the shell body. The longitudinal axis of the shell body is co-axially aligned with the longitudinal axis L1 of the lever 106, and the midpoint of the shell body corresponds to the longitudinal center of the lever 106.

More specifically, the lever 106 includes a top wall 154 forming a generally closed top end 156 of the lever 106 and oppositely facing side walls 158, 160 connected with the top wall 154 along their top edges. The side walls 158, 160 are angled inwardly toward each other along the longitudinal axis L1 of the lever from the central hub portion 152 toward opposite distal ends 112, 114 of the lever 106. The top wall 154 and the oppositely facing side walls 158, 160 cooperate to form a hollow interior chamber 166 therebetween. The bottom edges of the side walls 158, 160 form an open bottom end 168 of the lever 106, which is opposite the generally closed top end 156 and extends into the hollow interior chamber 166. Each side wall 158, 160 slopes outward from the generally closed top end 156 to the open bottom end 168 of the lever 106 to facilitate a nested arrangement of like levers 106, 106'. More specifically, the open bottom end 168 and the hollow interior chamber 166 of the lever 106 cooperate to receive a portion of a like lever 106' in nested engagement in the interior chamber 166 when the levers 106, 106' are stacked on top of one another.

The central hub portion 152 includes a receiving member 170 formed on a bottom surface of the top wall 154 in a central region thereof. The receiving member 170 has a shallow, inverted V-shaped groove 172 arranged at longitudinal center in a direction perpendicular to the longitudinal axis L1 of the lever. The groove 172 is shaped and sized so as to receive the knife edges 140 such that the lever 106 can pivot on the knife edges 140 about the pivot axis P1 when the lever 106 is assembled on the post 104.

The hub portion 152 also includes the elongated slots 174 for releasably receiving the retention bosses 142 of the post 104. The elongated slots 174 of the illustrated embodiment, for example, define pass-through openings formed in the groove 172 of the receiving member 170. The elongated slots 174 are oriented generally parallel to the longitudinal axis L1 of the lever and are provided in the groove 172 so as to be aligned vertically with the retention bosses 142 when the knife edges 140 are received in the groove 172. The elongated slots 174 are formed with a longitudinal dimension that provides a sufficient clearance for the resilient fingers 144 of the retention bosses 142 along the longitudinal axis L1 of the lever to allow the lever 106 to pivot freely about the fulcrum 108. The elongated slots 174 are also formed with a lateral dimension sufficient to allow the barbed ends 146 of the resilient fingers 144 to pass therethrough when pressed together, but narrow enough to center the lever 106 in a lateral horizontal direction transverse to the longitudinal axis L1 of the lever by the fit between the resilient fingers 144 and the sides of the elongated slots 174.

During assembly of the lever 106 on the post 104, the barbed ends 146 of the resilient fingers 144 are inserted into the elongated slots 174 of the lever. As a result, the resilient fingers 144 are urged together until their barbed ends 146 pass through the elongated slots 174 and the resilient fingers 144 snap fit into the elongated slots 174 of the lever. Once engaged with the slots 174, the resilient fingers 144 may substantially prevent the lever 106 from being axially disconnected from the post 104. In particular, the lever 106 is retained on the post 104 in a vertical direction between the barbed ends 146 of the resilient fingers 144 and the closed top end 138 of the post 104. In order to remove the lever 106, the resilient fingers 144 of the retention bosses 142 may be manually pressed or flexed together until the barbed ends 146 are aligned with and can pass through the elongated slots 174, thereby by allowing the lever 106 to be pulled away from the post 104.

The containers 110 are suspended on the arms 150 of the lever 106 at opposite ends 112, 114 of the lever 106. Each container 110 includes a bottom wall 178 forming a closed bottom end 176 of the container and one or more side walls 180 connected with the bottom wall 178 along their bottom edges. The bottom wall 178 and the one or more side walls 180 cooperate to form a hollow interior space 182 of the container 110 for receiving an object to be weighed or one or more weights. The top edges of the side walls 180 define an open top end 184 of the container 110 opposite the bottom wall 178 and extending into the hollow interior space 182 of the container. Each side wall 180 slopes outward from the bottom wall 178 to the open top end 184 of the container 110 to allow a nested arrangement of like containers 110, 110'. More specifically, the open top end 184 and the hollow interior space 182 of the container 110 cooperate to receive a portion of a like container 110' in nested engagement in the hollow interior space 182 when the like containers 110, 110' are stacked on top of one another.

In the illustrated embodiment, the containers 110 may have a generally conically tapered shape. For example, each container 110 may have a side wall 180 with a substantially circular transverse cross section gradually narrowing in circumference along a portion of the side wall 180 from the open top end 184. In a nested position, the hollow interior space 182 of the container 110 receives a portion of a like container 110' therewithin such that the bottom wall 178' of the like container 110' rests proximate the bottom wall 178 of the container 110.

Each container 110 also includes a handle 186 having ends pivotably coupled to oppositely facing portions of the side wall 180. The lever 106 includes a pair of notches formed 188 formed in the top wall 154 at proximate opposite ends 112, 114 of the lever 106. In assembly of the balance 100, a top portion of the handle 186 of a container 100 may be removably seated in a notch 188 to prevent the container 100 from inadvertently sliding off the lever 106.

With reference to FIGS. 5-8, a storage kit for a plurality of balances 100 includes a caddy 200 configured to accommodate nested component parts of the plurality of balances 100 in a compact arrangement so as to save space. In the illustrated embodiment, for example, the caddy 200 includes a pair of opposed first and second side walls 202 connected between a pair of opposed third and fourth side walls 204. The side walls 202, 204 are connected to a bottom wall 206 along their bottom edges so as to form a five-sided walled enclosure having an open top end 208 opposite the bottom wall 206. The caddy 200 may be molded (e.g., plastic injection) in a single piece to form one or more compartments 210 in the enclosure that are configured to removably store or support a base 102 in a nested arrangement with like bases 102', a post 104 in a nested arrangement with like posts 104', a lever 106 in a nested arrangement with like levers 106', and a container 110 in a nested arrangement with like containers 110'.

In particular, the illustrated caddy 200 may include a first interior compartment 210a having an elongate shape generally corresponding to the three-dimensional outer shape profile of a plurality of like posts 104, 104' nested within one another and sized to removably store the plurality of like posts in nested arrangement in a substantially horizontal position. The first interior compartment 210a is formed in a lower enclosure portion 212 of the caddy 200 adjacent the bottom wall 206 off-center relative to the longitudinal center length of caddy and extends parallel to the first side wall 202 in a horizontal direction.

The illustrated caddy 200 also includes a second interior compartment 210b having an elongate shape generally corresponding to the three-dimensional outer shape profile of a plurality of like levers 106, 106' nested on top of one another and sized to removably store the plurality of like levers in nested arrangement in a substantially horizontal position. The second interior compartment 210b is formed in the lower enclosure portion 212 of the caddy 200 adjacent the bottom wall 206 and is generally centered about the longitudinal center length of the caddy and extends parallel to the second side wall 202 in a horizontal direction.

In addition, the illustrated caddy 200 includes third and fourth interior compartments 210c, 210d each having a circular shape generally corresponding to a circular transverse cross section shape of a container 110 and sized to removably support thereon a plurality of like containers 110, 100' nested on top of one another. The third interior compartment 210c is formed in an upper enclosure portion 214 of the caddy 200 extending down from the open top end 208 proximate the third side wall 204 and overlies portions of the first and second interior compartments 210a, 210b. The fourth interior compartment 210d is also formed in the upper enclosure portion 214 and extends down from the open top end 208 proximate the fourth side wall 204 and the first interior compartment 210a and overlies a portion of the second interior compartment 210b.

The illustrated caddy further includes a fifth interior compartment 210e having a substantially rectangular shape generally corresponding to the peripheral shape profile of the open bottom end 120 of the main body 116 of a base 102 and sized to removably support thereon a plurality of like bases 102, 102' nested on top of one another in a substantially vertical position. The fifth interior compartment 210e is formed in the upper enclosure portion extending down from the open top end 208 and is generally centered about the longitudinal center length of the caddy between the third and fourth interior compartments 210c, 210d and overlies portions of the first, second, third, and fourth interior compartments 210a, 210b, 210c, 210d.

According to another embodiment, as illustrated in FIGS. 9-12, a modular balance 300 includes a base 302 with an integral, elevated pedestal member 304, a horizontal lever 306 removably and pivotably coupled to the pedestal member 304 at a fulcrum 308, and a pair of identical removable containers 310 suspended at opposite ends 312, 314 of the lever 306. When the balance 300 is assembled, a user places an object to be weighed into one of the containers 310 suspended at one end 312, 314 of the lever and adds/removes one or more weights to the container 310 suspended at the other end 312, 314 of the lever until the lever 306 is at equilibrium and the object is balanced. The weights then indicate the weight or mass of an object. When the balance 300 is disassembled, each of the base 302, the lever 306, and the containers 310 is stackable and nestable, respectively, with a base 302', a lever 306', and a container 310' of a like balance 300' for convenient storage of the balances.

The base 302 has a plastic molded one-piece construction, including a pair of frame-like support feet 316 formed integrally with the elevated pedestal member 304 for supporting the pedestal member 304 in a vertical orientation. The support feet 316 are formed co-planar and extend horizontally outward from opposite sides of the pedestal member 304 so as to define a generally flat, planar face of the base 302 for supporting the balance 300 on a flat operating surface.

Each support foot 316 includes a pair of generally parallel, spaced-apart, oppositely facing longitudinal frame members 318 extending from the pedestal member 304 and a transverse frame member 320 extending perpendicularly between the distal ends of the longitudinal frame members 318. Each of the longitudinal frame members 318 and the transverse member 320 is a hollow, channel-shaped member formed by an inner wall 322 and an outer wall 324 of the support foot 316. The outer wall 324 slopes outward from a closed top end 326 toward an open bottom end 328 of each longitudinal frame member 318 and from a closed top end 330 toward an open bottom end 332 of the transverse member 320 frame to facilitate a nested arrangement of corresponding support feet 316' of a like base 302'. More specifically, the open bottom ends 328, 332 and the hollow channels of the longitudinal and transverse frame member 318, 320 cooperate to receive a portion of a corresponding longitudinal or transverse frame member 318', 320' of a similarly oriented, like base 302' in nested engagement therein when like bases 302, 302' are stacked on top of one another.

In addition, the longitudinal frame members 318 and the transverse frame member 320 cooperate to define a U-shaped peripheral frame having a central aperture 334 formed between the longitudinal and transverse frame members 318, 320 and the pedestal member 304. The central aperture 334 is shaped and sized to receive and support a lower end portion of a container 310 herein. In the illustrated embodiment, for example, the central aperture 334 has a generally rectangular shape generally corresponding to a rectangular transverse cross section shape of a container 310.

The pedestal member 304 is substantially wedge shaped and is configured with a hollow interior volume 336 that is open at a bottom end 338 of the pedestal member 304. The open bottom end 338 and the hollow interior volume 336 cooperate to receive a portion of a pedestal member 304' of a similarly oriented, like base 302' when the base 302 is stacked on top of the like base 302'. The hollow interior volume 336 of the pedestal member 304 is configured to accommodate the received portion of the pedestal member 304' of the like base 302' for nested engagement within the hollow interior volume 336 when the base 302 is stacked on top of the like base 302'. A closed top end 340 of the pedestal member 304 is configured to pivotably support the lever 306 about the fulcrum 308 in an assembled state of the balance 300, as described below. The open bottom end 338 and the closed top end 340 are diametrically opposed and define a longitudinal central axis A3 of the pedestal member 304 therebetween that is perpendicular to a plane containing the open bottom end 338.

In the illustrated embodiment, for example, the pedestal member 304 includes a first pair of oppositely facing, generally flat side walls 342 that gradually slope inward toward the longitudinal central axis A3 of the pedestal member 304 and upward from near the open bottom end 338 to the closed top end 340 so as to facilitate nesting of a pedestal member 304' of a like base 302' within the hollow interior volume 336 of the pedestal member 304. The side walls 342 may include curvilinear transition regions at the open bottom end 338 of the pedestal member 304 that curve outwardly and transition to the support feet 316. A second pair of oppositely facing side walls 344 are each connected between the first pair of side walls 342. Together, the side walls 342, 344 cooperate to define a hollow wedge shape of rectangular transverse cross section with a gradual, smooth taper along two opposing sides and the hollow interior volume 336 therebetween. In a nested position, the closed top end 340' of a pedestal member 304' of a like base 302' is received in the hollow interior volume 336 of the pedestal member 304 of the base 302 proximate the closed top end 340 of the pedestal member 304.

Figure 12A:
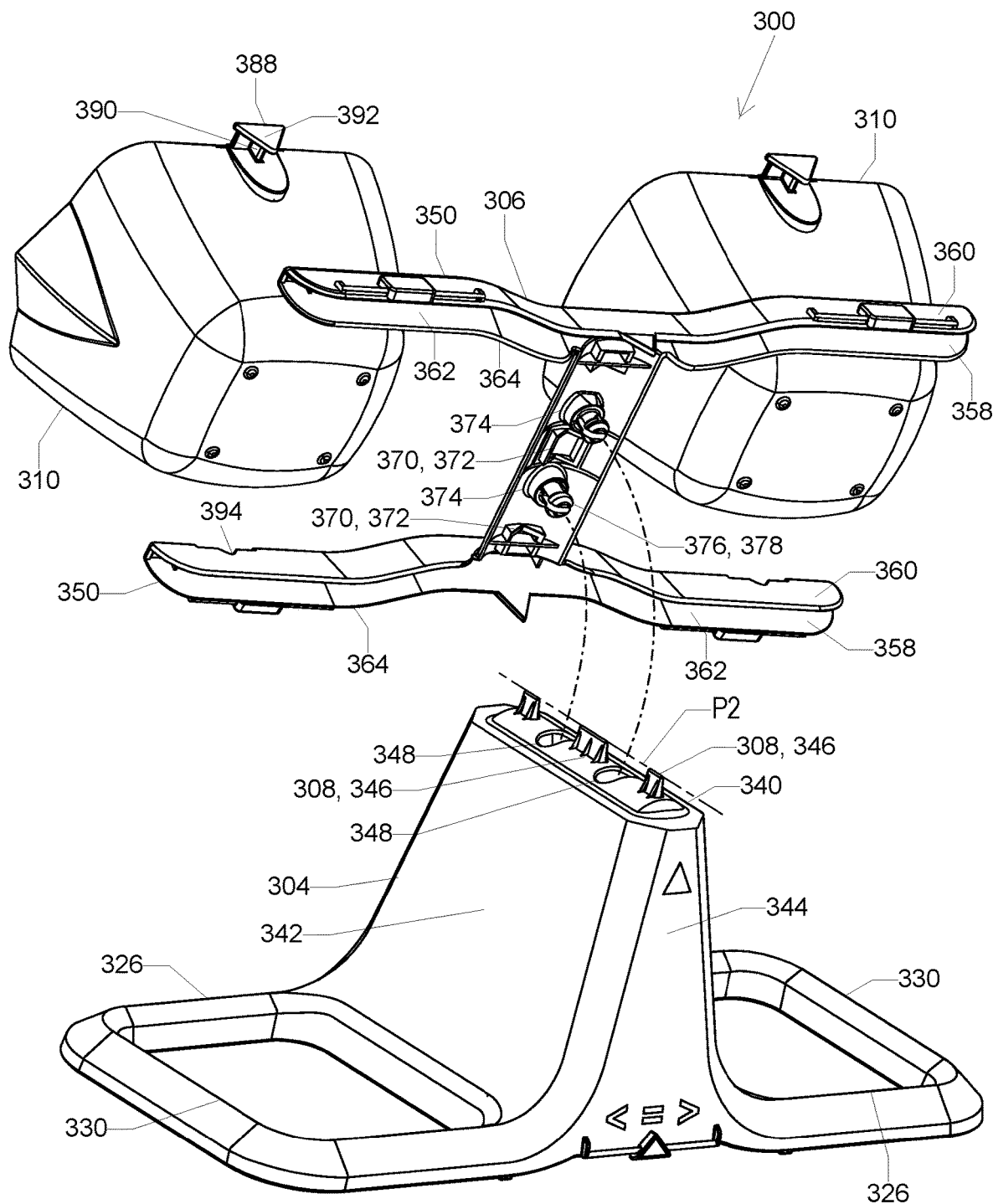
FIG. 12A is an exploded perspective view of the nesting balance of FIG. 9.
Figure 12B:
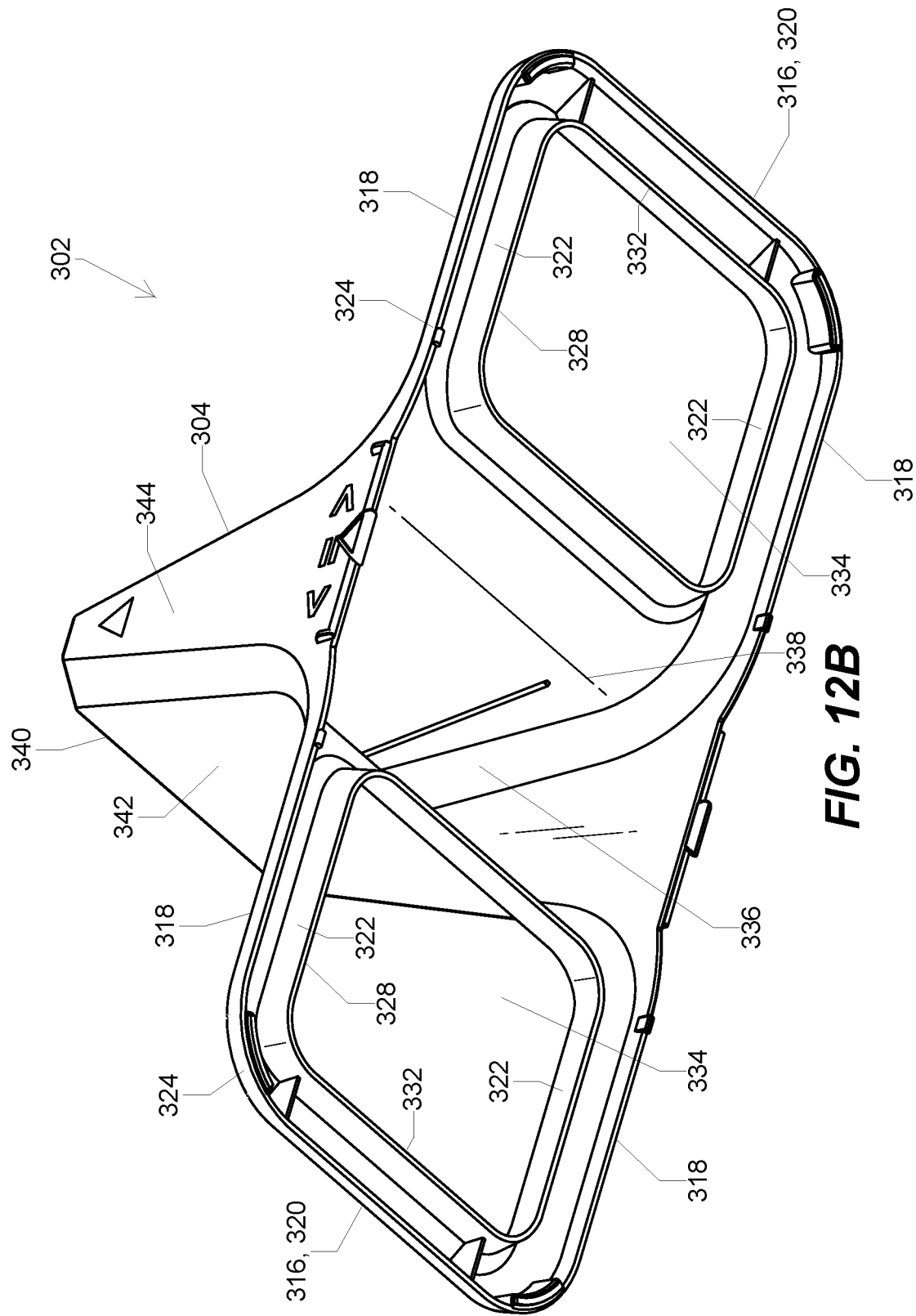
FIG. 12B is a bottom perspective view of a base of the nesting balance of FIG. 9.
Figure 13:
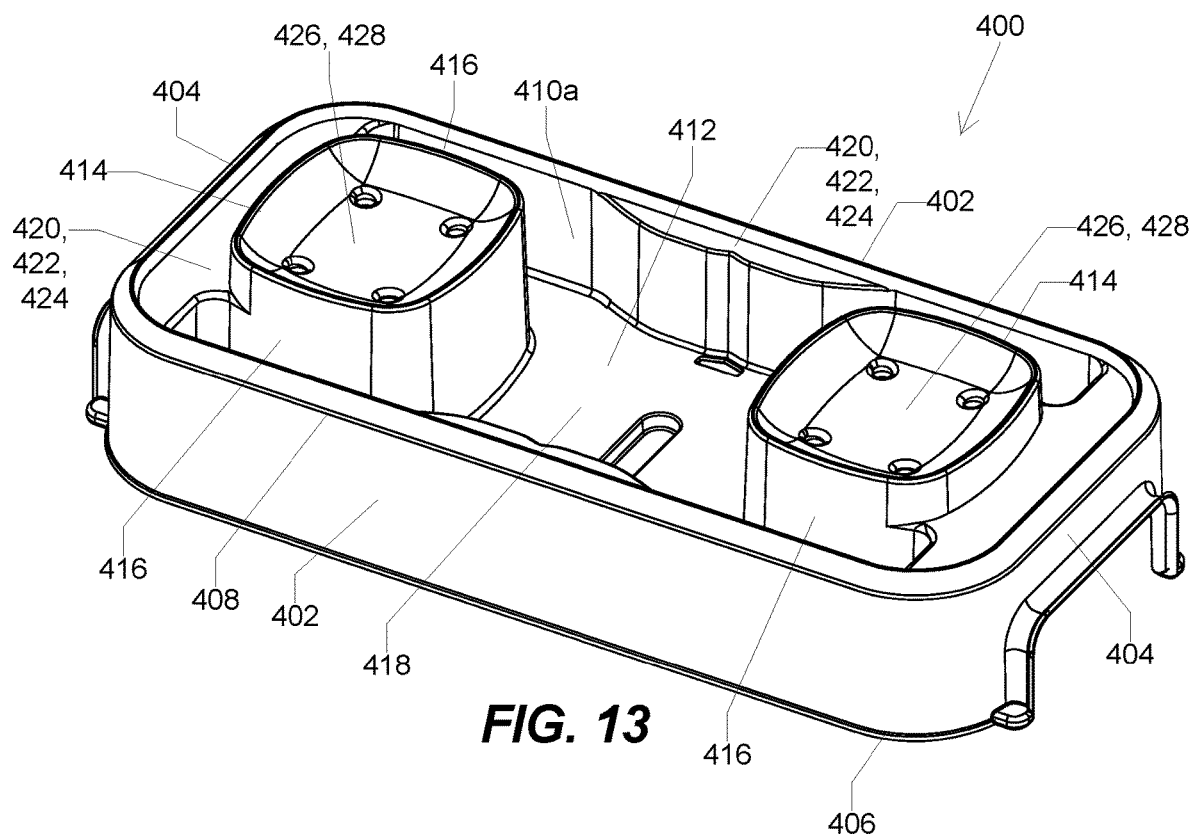
FIG. 13 is a perspective view of a storage caddy for storing components of the nesting balance of FIG. 9.
Figure 14:
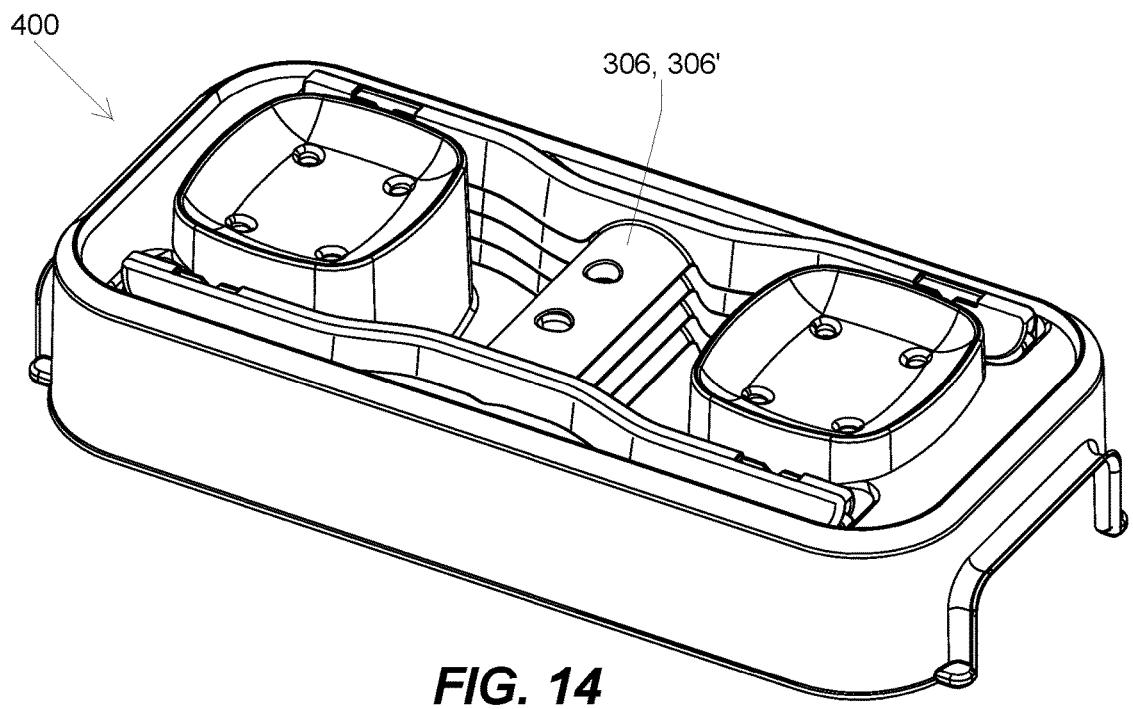
FIG. 14 is a perspective view of the storage caddy of FIG. 13 with levers of like nesting balances stored therein.
Figure 15:
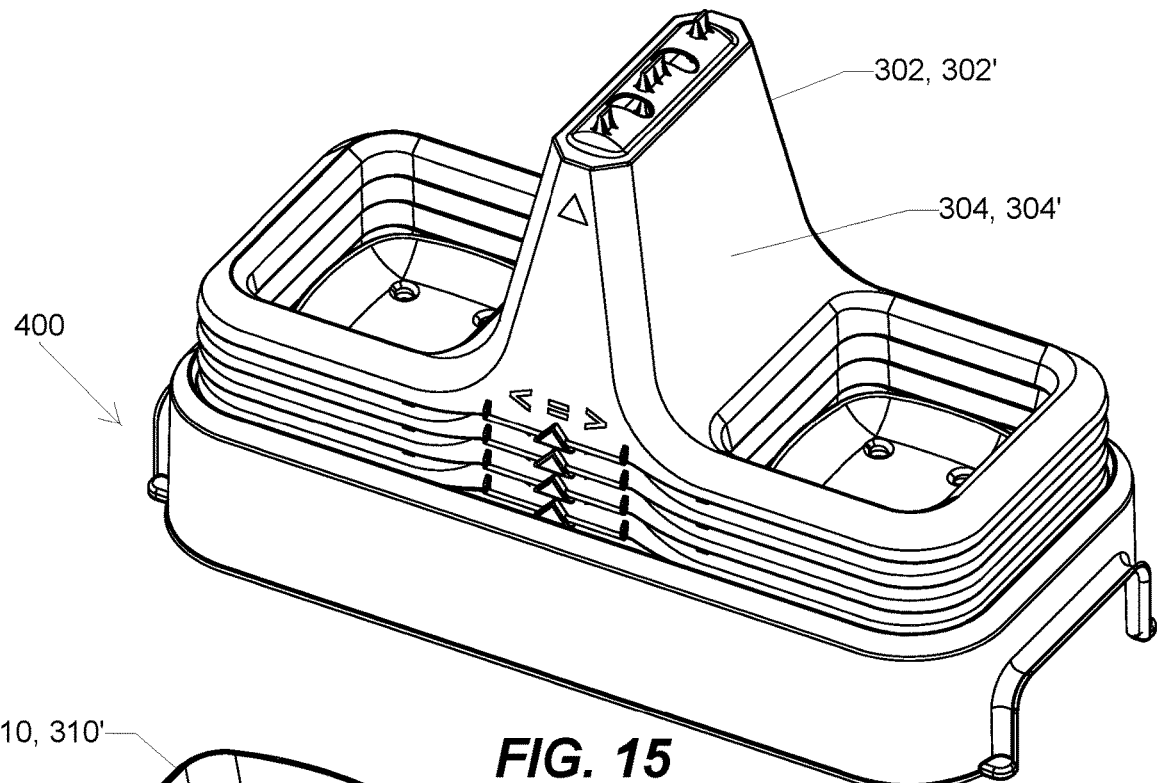
FIG. 15 is a perspective view of the storage caddy of FIG. 13 with levers and bases of like nesting balances stored therein.
Figure 16:
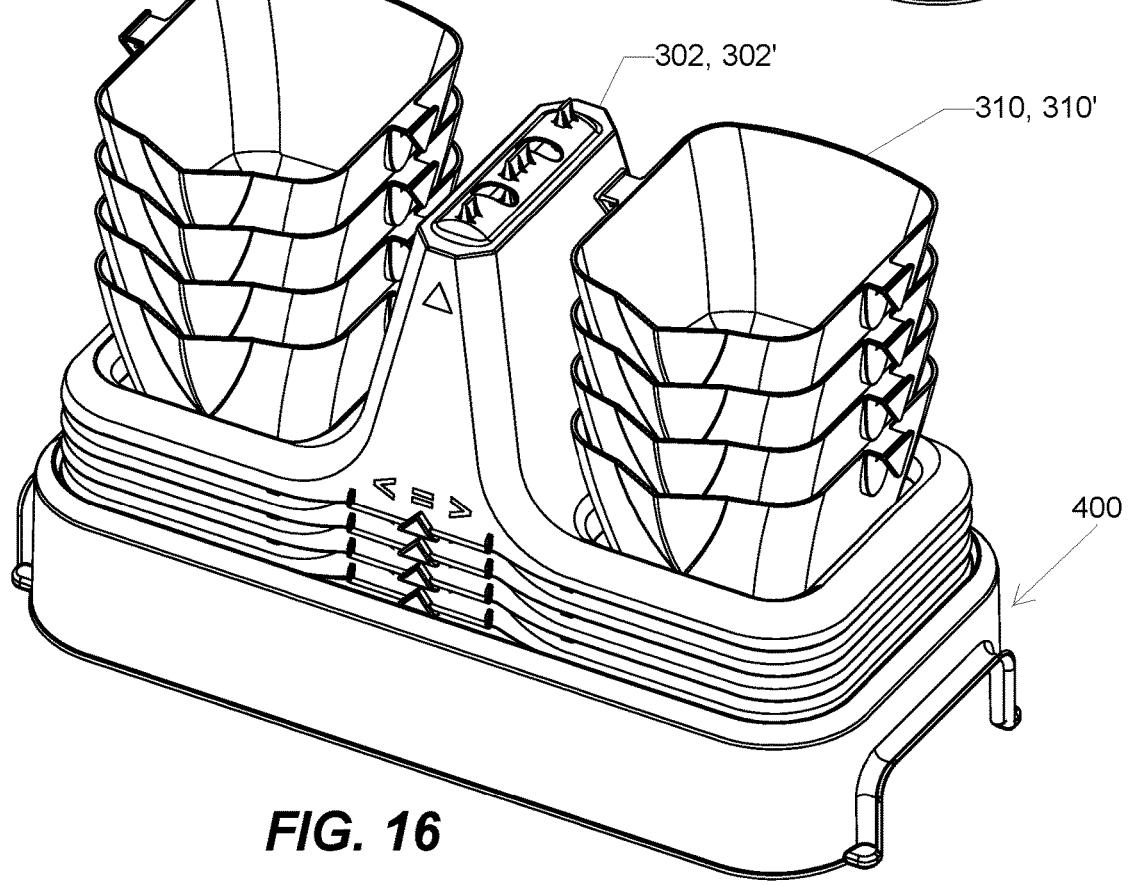
FIG. 16 is a perspective view of the storage caddy of FIG. 13 with levers, bases and containers of like nesting balances stored therein.

With reference to FIG. 12A, the closed top end 340 of the pedestal member 304 is configured to pivotably support the lever 306 about the fulcrum 308. In the illustrated embodiment, the fulcrum 308 includes a plurality of upwardly directed wedge members or inverted V-shaped knife edges 346 arranged on the closed top end 340 of the pedestal member 304. The knife edges 346 form a support on which the lever 306 pivots and are aligned with one another on a line that defines a pivot axis P2 of the lever 306, the pivot axis P2 being oriented perpendicular to a longitudinal axis L2 of the lever 306 and the longitudinal central axis A3 of the pedestal member 304. The knife edges 346 may be integrally formed with the pedestal member 304 or they may be individual components separately formed and attached to the pedestal member 304.

The closed top end 340 of the pedestal member 304 may also include one or more elongated slots 348 for releasably receiving retention bosses 374 attached to the lever 306, as described below. The elongated slots 348 of the illustrated embodiment, for example, define pass-through openings formed in the closed top end 340 of the pedestal member 304 and are configured to cooperate with the retention bosses 374 on the lever 306 to facilitate pivotably and releasably securing the lever 306 on the pedestal member 304.

With reference again to FIGS. 9-12, the lever 306 includes a pair of generally parallel, spaced-apart, oppositely facing arms 350 of equal length and a central hub portion 352 extending transversely between the arms 350 at their midpoints. In the illustrated embodiment, each arm 350 is formed as an elongated body having an enlarged U-shape in transverse cross section and is symmetrical about a plane perpendicular to its longitudinal axis and passing through the midpoint of its length.

Each arm 350 may include, for example, a top wall 354 forming a generally closed top end 356 of the arm and oppositely facing side walls 358, 360 connected with the top wall 354 along their top edges. The top wall 154 and the oppositely facing side walls 358, 360 cooperate to form a hollow interior chamber 362 therebetween. The bottom edges of the side walls 358, 360 form an open bottom end 364 of the arm 350, which is opposite the generally closed top end 356 and extends into the hollow interior chamber 362. Each side wall 358, 360 slopes outward from the generally closed top end 356 to the open bottom end 364 of the arm to allow a nested arrangement of arms 350 with like arms 350'. More specifically, the open bottom end 364 and the hollow interior chamber 362 of each arm 350 cooperate to receive a portion of a corresponding like arm 350' in nested engagement in the hollow interior chamber 362 when like levers 306, 306' are stacked on top of one another.

The central hub portion 352 is formed by a curved wall 368 that extends transversely between the pair of generally parallel, spaced-apart, oppositely facing arms 350 at their midpoints. The central hub portion 352 includes a plurality of spaced-apart receiving members 370 formed on a bottom surface of the curved wall 368. The receiving members 370 are aligned with one another in a direction perpendicular to the longitudinal axis L2 of the lever 306 at the longitudinal center of the lever 306. Each receiving member 370 includes a shallow, inverted V-shaped groove 372 extending along the pivot axis P2 of the lever 306. Each groove 372 is shaped and sized so as to receive a knife edge 346 of the pedestal member 304 such that the lever 306 can pivot on the knife edges 346 about the pivot axis P2 when the lever 306 is assembled on the pedestal member 304.

The central hub portion 352 also includes one or more retention bosses 374 arranged between the receiving members 370 and extending downward from the curved wall 368 in a vertical direction for releasably engaging the elongated slots 348 of the pedestal member 304. The retention bosses 374, for example, may each include a pair of resilient fingers 376 aligned opposite the elongated slots 348 in a vertical orientation and having barbed ends 378 configured to provide a releasable snap-fit coupling with the lever 306 in the elongated slots 348, as described in more detail below. The retention bosses 374 may be integrally formed with the central hub portion 352 or they may be individual components separately formed and attached to the central hub portion 352.

The elongated slots 348 of the pedestal member 304 are oriented generally parallel to the longitudinal axis L2 of the lever 306 and are aligned vertically with the retention bosses 374 when the knife edges 346 are received in the grooves 372 of the receiving members 370. The elongated slots 348 are formed with a longitudinal dimension that provides a sufficient clearance for the resilient fingers 376 of the retention bosses 374 along the longitudinal axis L2 of the lever 306 so as to allow the lever 306 to pivot freely about the fulcrum 308. The elongated slots 348 are also formed with a lateral dimension sufficient to allow the barbed ends 378 of the resilient fingers 376 to pass therethrough when pressed together, but narrow enough to center the lever 306 in a lateral horizontal direction transverse to the longitudinal axis L2 of the lever 306 by the fit between the resilient fingers 376 and the sides of the elongated slots 348.

During assembly of the lever 306 on the pedestal member 304, the barbed ends 378 of the resilient fingers 376 of the retention bosses 374 on the lever 306 are inserted into the elongated slots 348 of the pedestal member 304. As a result, the resilient fingers 376 are urged together until their barbed ends 378 pass through the elongated slots 348 and the resilient fingers 376 snap fit into the elongated slots 348. Once engaged with the elongated slots 348, the resilient fingers 376 may substantially prevent the lever 306 from being axially disconnected from the pedestal member 304. In particular, the lever 306 is retained on the pedestal member 304 in a vertical direction between the barbed ends 378 of the resilient fingers 376 and the closed top end 340 of the pedestal member 304. In order to remove the lever 306, the resilient fingers 376 may be manually pressed or flexed together until their barbed ends 378 are aligned with and can pass through the elongated slots 348, thereby by allowing the lever 306 to be pulled away from the pedestal member 304.

The containers 310 are suspended between the arms 350 at opposite ends 312, 314 of the lever 306. Each container 310 includes a bottom wall 380 forming a closed bottom end of the container and one or more side walls 382 connected with the bottom wall 380 along their bottom edges. The bottom wall 380 and the one or more side walls 382 cooperate to form a hollow interior space 384 for receiving an object to be weighed or one or more weights. The top edges of the side walls 382 define a generally open top end 386 of the container 310 opposite the bottom wall 318 and extending into the hollow interior space 384 of the container. Each side wall 382 slopes outward from the bottom wall 380 to the open top end 386 of the container 310 to allow a nested arrangement of the container 310 with a like container 310'. More specifically, the open top end 386 and the hollow interior space 384 of the container 310 cooperate to receive a portion of a like container 310' in nested engagement in the hollow interior space 384 when like containers 310, 310' are stacked on top of one another.

In the illustrated embodiment, each container 310 may have a generally rectangular shape that is tapered inwardly along a longitudinal length of the container from its open top end 386. For example, a container 310 may include a pair of oppositely facing flat side walls 382a connected between a pair of oppositely facing curved side walls 382b, which cooperate to define a bucket shape having a substantially rectangular transverse cross section. Each side wall 382a, 382b has a gradual, smooth taper along a portion of the sidewall from the open top end 386 of the container 310. In a nested position, the hollow interior space 384 of the container 310 receives a portion of a like container 310' therein such that the bottom wall 380' of the like container 310' rests proximate the bottom wall 380 of the container 310.

The containers 310 also each include a pair of oppositely facing support brackets 388 arranged on the flat side walls 382a. Each support bracket 388 includes a downward facing knife edge 390 configured to be pivotably received in a corresponding notch 394 formed along the top wall 354 of an arm 350. As a result, in an assembled state of the balance, each container 310 can be supported between the arms 350 of the lever 306 and can pivot on the arms 350 about a pivot axis that is defined by the pair of oppositely facing support brackets 388 and is oriented perpendicular to the longitudinal axis L2 of the lever 306. In addition, each support bracket 388 may also include an outer lip portion 392 configured to be removably received in a corresponding, pass-through opening 396 formed in the top wall 354 of an arm 350. In an assembled state of the balance 300, the outer lip portions 392 of the oppositely facing support brackets 388 of each container 310 are retained between the side walls 358, 360 of the arm 350 to prevent the containers 310 from inadvertently sliding off the lever 306.

With reference to FIGS. 13-16, a storage kit for a plurality of balances 300 includes a caddy 400 configured to accommodate nested component parts of the plurality of balances 300 in a compact arrangement so as to save space. In the illustrated embodiment, for example, the caddy 400 includes a pair of opposed first and second side walls 402 connected between a pair of opposed third and fourth side walls 404. The side walls 402, 404 are connected to a bottom wall 406 along their bottom edges so as to form a five-sided walled enclosure having an open top end 408 opposite the bottom wall 406. The caddy 400 may be molded (e.g., plastic injection) in a single piece to form one or more compartments 410 and/or support structures in the enclosure that are configured to removably store or support a base 302 in a nested arrangement with like bases 302', a lever 306 in a nested arrangement with like levers 306', and a container 310 in a nested arrangement with a like containers 310'.

In particular, the side walls 402, 404 and bottom wall 406 of the illustrated caddy 400 define an interior volume 412 therebetween. A pair of container platforms 414 are arranged on the bottom wall 406 in the interior volume 412 and are spaced symmetrically on opposite sides of a longitudinal midpoint of the caddy 400. The space created in the interior volume 412 between the container platforms 414 and the side walls 402, 404 forms a first storage compartment 410a having a H-shape generally corresponding to the three-dimensional outer shape profile of a plurality of like levers 306, 306' nested on top of one another. In this way, the first storage compartment 410a is configured to removably receive and store therein the plurality of like levers 306, 306' in nested arrangement in a substantially horizontal position proximate the bottom wall 406. In particular, the oppositely facing arms 350 of a lever 306 may be disposed in generally parallel, spaced-apart, oppositely facing segments 416 of the first storage compartment 410a. Each of the segments 416 extends between a container platform 414 and one of the first or second side walls 402 and is parallel to the first or second side wall 402. The central hub portion 352 of the lever 306 may be disposed in a central segment 418 of the first storage compartment 410a generally centered about the longitudinal center length of the caddy 400 between the container platforms 414 and oriented transversely between the first and second side walls 402.

In addition, a plurality of like bases 302, 302' nested within one another may be stored on the caddy 400 in a substantially horizontal position above the nested like levers 306, 306' in a second storage compartment 420 formed at an upper end 422 of the caddy 400. In the illustrated embodiment, one or more of the upper edges of the first, second, third and fourth side walls 402, 404 of the caddy 400 include flanged portions 424 that extend inwardly to support a base 302 thereon at the upper end 422 of the caddy 400. The pedestal member 304 of the base 302 is supported above the central hub portions 352 of the nested levers 306 stored in the caddy 400 and the support feet 316 of the base 302 are supported above the arms 350 of the nested levers 306.

The container platforms 414 each include a recessed portion 426 formed at a top end thereof so as to define a pair of third storage compartments 428. The recessed portion 426 has a substantially rectangular shape generally corresponding to a rectangular transverse cross section shape of a container 310 and is sized to removably support thereon a plurality of like containers 310, 310' nested on top of one another. The recessed portions 426 are externally accessible through the central apertures 334 of the feet 316 of the bases 302 supported on the caddy 400. As noted above, each support foot 316 includes a generally rectangular central aperture 334 formed between the longitudinal frame members 318 and the transverse frame member 320 of the foot 316. Each central aperture 334 is configured to freely receive therethrough a portion of a container 310. The central apertures 334, 334' of corresponding support feet 316, 316' are vertically aligned when a plurality of like bases 302, 302' in nested arrangement are stored on the caddy 400. In this way, a plurality of nested containers 310, 310' may be received through the apertures 321, 321' of the support feet 316, 316' of the nested like bases 302, 302' and may be supported on the container platforms 414.

What is claimed is:

1. A balance assembly having an assembled state and an unassembled state, the balance assembly comprising:

a base configured to receive a portion of a like base in a nesting relation in an unassembled state of the balance assembly;

a pedestal coupled to the base in an assembled state of the balance assembly, the pedestal configured to receive a portion of a like pedestal in a nesting relation in the unassembled state;

a lever removably and pivotably coupled to the pedestal about a fulcrum centered along a length of the lever in the assembled state, the lever configured to receive a portion of a like lever in a nesting relation in the unassembled state; and a pair of containers removably supported at opposite ends of the lever in the assembled state, each container configured to receive a portion of a like container in a nesting relation in the unassembled state, wherein the fulcrum is provided at a closed top end of the pedestal where a knife edge and a complementary groove come together to define a pivot axis, and wherein a releasable snap-fit coupling between the pedestal and the lever is provided by an elongated slot and a retention boss situated along the pivot axis at the closed top end of the pedestal.

2. The balance assembly of claim 1, wherein the pedestal is removably coupled to the base.

3. The balance assembly of claim 1, wherein the base includes an open interior cavity and one or more sloped side walls to allow the base to receive a portion of a like base in a nesting relation in the unassembled state.

4. The balance assembly of claim 1, wherein the pedestal includes an open interior cavity and one or more sloped side walls to allow the pedestal to receive a portion of a like pedestal in a nesting relation in the unassembled state.

5. The balance assembly of claim 1, wherein the lever includes an open interior cavity and one or more sloped side walls to allow the lever to receive a portion of a like lever in a nesting relation in the unassembled state.

6. The balance assembly of claim 1, wherein each container includes an open interior cavity and one or more sloped side walls to allow the container to receive a portion of a like container in a nesting relation in the unassembled state.

7. The balance assembly of claim 1, wherein the base includes a pair of frame-like support feet extending outward from opposite sides of the pedestal member, each support foot having a pair of generally parallel, spaced-apart, oppositely facing longitudinal frame members and a transverse frame member extending perpendicularly between the longitudinal frame members, each of the longitudinal frame members and the transverse frame member having an open interior cavity and one or more sloped side walls to allow the support feet to receive portions of like support feet in a nesting relation in the unassembled state.

8. The balance assembly of claim 1, wherein the knife edge of the fulcrum is arranged on the closed top end of the pedestal and the lever includes the complementary groove.

9. The balance assembly of claim 1, wherein the retention boss is arranged on the pedestal and the elongated slot is formed in the lever.

10. The balance assembly of claim 1, wherein the retention boss includes a pair of resilient fingers having barbed ends.

11. A storage kit for one or more modular balances, the storage kit comprising:

components of a plurality of balances in an unassembled state, including a plurality of bases, a plurality of levers configured to removably and pivotably couple to the plurality of bases in an assembled state of the plurality of balances via a plurality of pedestals, and a plurality of containers configured to removably couple to the lever in the assembled state of the plurality of balances; and a one-piece molded caddy having a bottom wall and an open top end, the caddy including a first interior compartment supporting one or more portions of the plurality of bases in a nesting relation, a second interior compartment supporting one or more portions of the plurality of levers in a nesting relation, a third interior compartment supporting one or more portions of a first set of the plurality of containers in a nesting relation, and a fourth interior compartment supporting one or more portions of a second set of the plurality of containers in a nesting relation, wherein the plurality of nested bases in the first interior compartment form a first recess along the third interior compartment, the first recess receiving a complementary outer profile of the first set of the plurality of containers, and wherein the plurality of nested bases in the first interior compartment form a second recess along the fourth interior compartment, the second recess receiving a complementary outer profile of the second set of the plurality of containers.

12. The storage kit of claim 11, wherein the plurality of bases each includes an interior cavity and one or more sloped side walls to allow each base to receive a portion of a like base in a nesting relation.

13. The storage kit of claim 11, wherein the plurality of levers each includes an interior cavity and one or more sloped side walls to allow each lever to receive a portion of a like lever in a nesting relation.

14. The storage kit of claim 11, wherein the plurality of containers each includes an interior cavity and one or more sloped side walls to allow each container to receive a portion of a like container in a nesting relation.

15. The storage kit of claim 11, wherein the plurality of pedestals are each configured to removably couple to one of the plurality of bases in the assembled state and the caddy includes a fifth interior compartment supporting one or more portions of the plurality of pedestals in a nesting relation.

16. The storage kit of claim 15, wherein the plurality of pedestals each includes an interior cavity and one or more sloped side walls to allow each pedestal to receive a portion of a like pedestal in a nesting relation.

17. The storage kit of claim 15, wherein the fifth interior compartment is formed in a lower enclosure portion of the caddy adjacent the bottom wall off-center relative to a longitudinal center length of caddy and extends parallel to a first side wall of the caddy, wherein the first interior compartment is formed in the lower enclosure portion of the caddy adjacent the bottom wall and is generally centered about the longitudinal center length of the caddy and extends parallel to a second side wall of the caddy opposite the first side wall, wherein the second interior compartment is formed in an upper enclosure portion of the caddy extending down from the open top end proximate a third side wall of the caddy and overlies portions of the fifth and first interior compartments, wherein the third interior compartment is formed in the upper enclosure portion and extends down from the open top end proximate a fourth side wall of the caddy opposite the third side wall and the fifth interior compartment and overlies a portion of the first interior compartment, and wherein the fourth interior compartment is formed in the upper enclosure portion extending down from the open top end and is generally centered about the longitudinal center length of the caddy between the second and third interior compartments and overlies portions of the fifth, first, second, and third interior compartments.

18. A storage kit for one or more modular balances, the storage kit comprising:
   components of a plurality of balances in an unassembled state, including
      a plurality of bases,
      a plurality of levers configured to removably and pivotably couple to the plurality of bases in an assembled state of the plurality of balances via a plurality of pedestals, and
      a plurality of containers configured to removably couple to the lever in the assembled state of the plurality of balances; and
   a one-piece molded caddy having a bottom wall and an open top end, the caddy including
      a first interior compartment supporting one or more portions of the plurality of bases in a nesting relation,
      a second interior compartment supporting one or more portions of the plurality of levers in a nesting relation,
      a third interior compartment supporting one or more portions of a first set of the plurality of containers in a nesting relation, and
      a fourth interior compartment supporting one or more portions of a second set of the plurality of containers in a nesting relation,
   wherein a pair of container platforms, each having a recessed portion, are arranged on the bottom wall,
   wherein each of the plurality of bases includes a pair of frame-like support feet each defining an aperture therethrough,
   wherein the first and second interior compartments are formed within the walled enclosure to extend at least partially around each of the pair container platforms, and
   wherein the third interior compartment and the fourth interior compartment are formed by the recessed portions of the pair of container platforms and are externally accessible through the respective apertures of the support feet of the plurality of bases.

19. The storage kit of claim 18, wherein the second interior compartment supporting the plurality of levers is formed in an H-shape in the bottom wall.

* * * * *